United States Patent Office 3,008,108
Patented Nov. 7, 1961

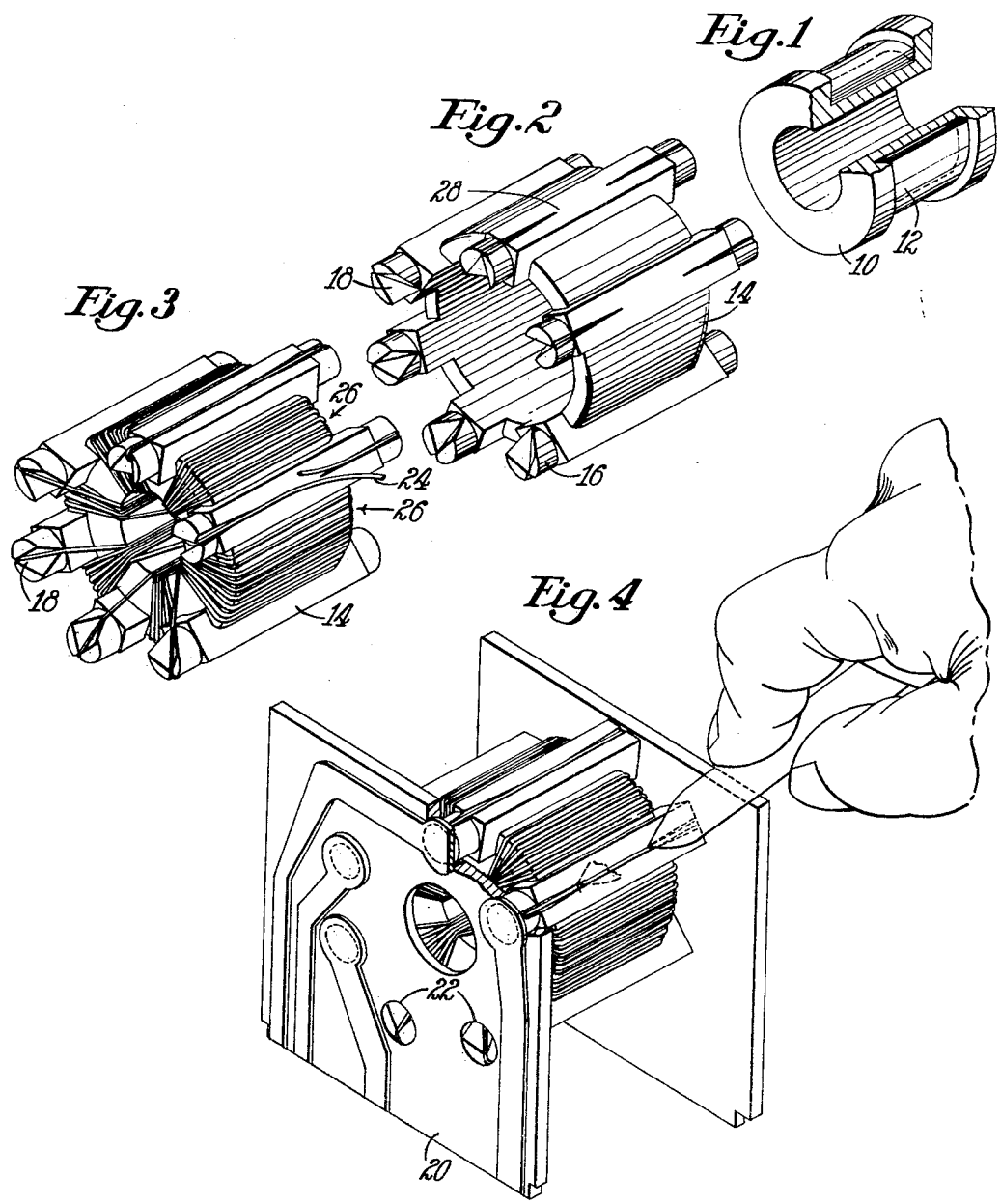

3,008,108
TOROIDAL COILS
Corwin W. Baker, Salem, N.H., and Frederick S. Sillars, Beverly, Mass., assignors to Burroughs Corporation, Detroit, Mich., a corporation of Michigan
Filed Nov. 13, 1956, Ser. No. 621,645
3 Claims. (Cl. 336—185)

This invention relates generally to electric circuit components of the type commonly designated toroidal coils. More particularly, the invention relates to improvements in such coils, which improvements reduce the cost of winding such coils and connecting them to their associated circuits or circuit elements.

Toroidal coils are made in a large variety of shapes and sizes by winding wire about a toroidal coil form having a center opening, each turn of the wire passing through the center opening and around the outside of the form. The number of individual windings on a coil form may vary. For some purposes a single winding suffices, while other applications may require a larger number, for example, four or six individual windings. In the past it has been the practice to wind each individual winding separately and to bring the ends of the windings out as flexible leads for connection to a circuit by point to point wiring. The connection of such a toroidal coil to an associated circuit can be relatively difficult and time consuming, particularly when the coil is small and comprises a plurality of windings, for the operations of correctly identifying and soldering a number of fine wires requires considerable care and skill. Particularly in view of the advent of printed circuit techniques in which point to point wiring is minimized as far as possible, the manual connection of such toroidal coils to printed circuits is a relatively slow and costly operation.

The illustrative embodiment of the invention relates specifically to the problems involved in the circuit connection of a memory-type toroidal coil of specific design. However, it will be seen that the teachings of the invention are applicable to toroidal coils of a wide variety of shapes and sizes.

The specific toroidal coil mentioned above comprises a plurality of windings carried by a cylindrical coil form having an outside diameter of approximately one-quarter inch. The coil form on which the wire is wound comprises a core, consisting of a spool-shaped ceramic core blank carrying magnetic laminations, and a plastic tubular sleeve or core shield into which the core is inserted for protection after annealing the laminations.

It is a general object of the present invention to provide improvements in toroidal coils, particularly in respect to the manner in which their windings are terminated to provide outstanding junction points or terminations which will facilitate the mechanical and electrical connection of such coils to associated circuit elements, particularly those employing printed wiring panels.

In accordance with a feature of the invention facilitating the provision of such outstanding terminations, an improved toroidal coil form is provided having a plurality of circumferentially spaced outstanding projections at least one of which is grooved to receive a turn of the winding wire. Where a termination of a winding is desired, the wire is attached to the form by disposing it over the end of a projection and securing it in such disposition to form a conductive termination spaced outwardly of the winding surface for enhanced accessibility.

In the illustrative embodiment a plurality of the projections extend axially and have their ends disposed in a common plane to facilitate mechanical assembly and dip soldering of a plurality of terminations to a printed wiring panel. While the projections have been illustrated as being provided on the coil form by an improved form of core shield, it will be obvious that, if desired, they could be formed on another portion of the coil form.

Other features and advantages of the invention will best be understood by the following description taken in conjunction with the appended drawings in which:

FIG. 1 is an angular view, partly in section of a toroidal core constituting a portion of the toroidal coil of the present invention;

FIG. 2 is an angular view of a core shield embodying the present invention and adapted to receive the core of FIG. 1 to form a toroidal coil form;

FIG. 3 is an angular view of a toroidal coil embodying the present invention; and FIG. 4 is an angular view of a toroidal coil embodying the present invention, the coil being shown connected to printed wiring panels. In all the figures, the article is shown greatly enlarged.

Referring to the drawings, FIG. 1 shows the core 10 of a toroidal coil of the magnetic memory type in which the memory is carried in magnetic laminations 12. Previously, as described above, this core had merely been protected with a plastic sleeve and then wound to provide as many individual windings as necessary, employing separate lengths of wire to form each winding.

According to the present invention, outstanding terminations of the windings are to be provided, these being supported by the coil form in fixed disposition. Accordingly, instead of the tubular plastic core shield, a cylindrical core shield 14 (FIG. 2) is provided, the shield being molded of ceramic material and having an inside diameter permitting the core 10 to be inserted into the shield for protecting the laminations 12. The core shield 14 is provided with a plurality of axially outstanding projections 16, these projections being spaced circumferentially, preferably in accordance with the number of turns of the several windings.

The free end of each projection 16 is formed with a groove 18 for accommodating winding wire, the groove being preferably flared inwardly as illustrated to facilitate positioning of the wire in the groove during the course of winding. As shown in FIG. 4, a coil comprising a plurality of projections 16 arranged in a single plane may be assembled to a printed wiring panel or circuit card 20 which is perforated to receive the projections. For such assembly, the groove 18 is preferably carried down the outside margin of the projection 16 as shown, at least partially to accommodate the wire. When thus assembled, the wire loop portion disposed over the end of a projection 16 will be outwardly exposed adjacent the outer surface of the printed wiring panel 20 so that it may be electrically connected to the circuit pattern as by soldering the wire portion to junction points of the wiring panel.

In making the toroidal coil provided by the present invention, a single length of wire 24 may be used, even if the coil is to comprise a plurality of windings. This wire is wound toroidally about the coil form comprising the core 10 and the core shield 14, and the wire is attached to the form where terminations of the windings are to be made. With the core shield provided by the present invention, each termination is made by passing a toroidally disposed portion of a turn of the wire over the end of a projection 16 to form an upstanding loop. The wire is then temporarily attached to the form at the projections by fitting a circuit card 20 (FIG. 4), having perforations 22 matching the projections 16, over the loops at the ends of the projections, thus clamping or trapping the wire against the outside of the projections. At this time soldering operations to join the outwardly exposed portions of the winding wire to the wiring pattern and firmly to attach the wire to the coil form may be performed. This operation may be facilitated, if desired, by metallizing the outer ends of the projections 16.

After the wire has been thus attached to the coil form where terminations are desired, the wire is severed between adjacent sections 26 of the winding to form individual windings. In the form of coil shown in FIG. 4, the severing step may be accomplished by making a pair of cuts, as shown, between pairs of oppositely extending projections at either end of the core shield. It will be obvious that terminations can be provided at both ends of the coil as indicated in FIG. 4, or at one end only.

Advantageously, the core shield 14 is provided with longitudinal square-shouldered ribs 28 between such pairs of projections, the ribs not only making easier the cutting operations, but also facilitating rotation of the coil form during the winding operations by providing easily gripped surfaces.

Having thus described our invention, what we claim as new and desire to secure by Letters Patent of the United States is:

1. A toroidal coil form adapted for use with printed wiring panels comprising a generally cylindrical body of insulating material, said form being axially open whereby it is adapted to receive and support a toroidal winding, a plurality of circumferentially spaced projections of the body outstanding axially from an end thereof, the outer end of at least one projection having a radial groove to receive and support against lateral displacement, and without bonding thereto, a toroidally disposed portion of a continuous toroidal winding supported on the form.

2. A toroidal coil form adapted for use with printed wiring panels comprising a generally cylindrical body of insulating material, said form being axially open whereby it is adapted to receive and support a toroidal winding, a plurality of circumferentially spaced projections, each grooved to receive a toroidal winding portion, outstanding axially from both ends of said body, the projections on one end being disposed opposite the projections on the other end, and longitudinal ribs extending between pairs of oppositely disposed projections.

3. A toroidal coil form adapted for use with printed wiring panels comprising a generally cylindrical body of insulating material, said form being axially open whereby it is adapted to receive and support a toroidal winding, a plurality of circumferentially spaced projections, each grooved to receive a toroidal winding portion, outstanding axially from both ends of said body, the projections on one end being disposed opposite the projections on the other end, and longitudinal square-shouldered ribs extending between pairs of oppositely disposed projections.

References Cited in the file of this patent

UNITED STATES PATENTS

| | | |
|---|---|---|
| 1,408,992 | Doron | Mar. 7, 1922 |
| 1,647,615 | Gargan | Nov. 1, 1927 |
| 1,929,446 | Ogg | Sept. 30, 1930 |
| 2,290,680 | Franz | July 21, 1942 |
| 2,339,054 | Craddock et al. | Jan. 11, 1944 |
| 2,339,067 | Franz | Jan. 11, 1944 |
| 2,404,185 | Mann | July 16, 1946 |
| 2,434,511 | Osterman et al. | Jan. 13, 1948 |
| 2,486,751 | McMichael | Nov. 1, 1949 |
| 2,667,624 | Bels | Jan. 26, 1954 |
| 2,823,362 | Geroulo et al. | Feb. 11, 1958 |
| 2,869,089 | Hampel | Jan. 13, 1958 |